United States Patent
Bhatia et al.

(10) Patent No.: US 7,673,068 B2
(45) Date of Patent: Mar. 2, 2010

(54) METHOD AND SYSTEM FOR IMPLEMENTING A HIGH AVAILABILITY VLAN

(75) Inventors: Jagjeet Bhatia, Simi Valley, CA (US); Uday Shankar, Bangalore (IN)

(73) Assignee: Alcatel Lucent, Paris (FR)

( * ) Notice: Subject to any disclaimer, the term of this patent is extended or adjusted under 35 U.S.C. 154(b) by 1042 days.

(21) Appl. No.: 11/360,646

(22) Filed: Feb. 23, 2006

(65) Prior Publication Data

US 2006/0235995 A1 Oct. 19, 2006

Related U.S. Application Data

(60) Provisional application No. 60/672,308, filed on Apr. 18, 2005.

(51) Int. Cl.
*G06F 15/173* (2006.01)

(52) U.S. Cl. ........................ 709/238; 709/224; 709/249; 370/390; 370/428; 370/432

(58) Field of Classification Search ......... 709/223–224, 709/238, 249; 370/230, 389, 390, 395.31, 370/428, 432
See application file for complete search history.

(56) References Cited

U.S. PATENT DOCUMENTS

| | | | |
|---|---|---|---|
| 5,892,912 A | 4/1999 | Suzuki et al. | |
| 5,914,938 A | 6/1999 | Brady et al. | |
| 6,181,699 B1 * | 1/2001 | Crinion et al. | 370/392 |
| 6,185,214 B1 | 2/2001 | Schwartz et al. | 370/401 |
| 6,430,621 B1 * | 8/2002 | Srikanth et al. | 709/238 |
| 6,633,567 B1 | 10/2003 | Brown | |
| 6,763,023 B1 | 7/2004 | Gleeson et al. | 370/392 |
| 6,775,290 B1 * | 8/2004 | Merchant et al. | 370/395.53 |
| 6,975,581 B1 * | 12/2005 | Medina et al. | 370/401 |
| 6,990,106 B2 * | 1/2006 | Bhatia | 370/395.53 |
| 7,327,730 B2 * | 2/2008 | Chen et al. | 370/390 |
| 2002/0174307 A1 * | 11/2002 | Yoshida et al. | 711/152 |
| 2003/0152075 A1 * | 8/2003 | Hawthorne et al. | 370/389 |
| 2003/0210696 A1 * | 11/2003 | Goldflam | 370/395.1 |
| 2004/0003094 A1 | 1/2004 | See | 709/227 |
| 2004/0054655 A1 | 3/2004 | Brown | 707/1 |
| 2004/0264484 A1 * | 12/2004 | Kui et al. | 370/402 |
| 2005/0053006 A1 | 3/2005 | Hongal et al. | 370/236.2 |
| 2005/0058118 A1 * | 3/2005 | Davis et al. | 370/351 |
| 2005/0083952 A1 | 4/2005 | Swain | |
| 2006/0023718 A1 * | 2/2006 | Joly | 370/392 |

FOREIGN PATENT DOCUMENTS

WO 2004/032426 A 4/2004

* cited by examiner

*Primary Examiner*—Oanh Duong
(74) *Attorney, Agent, or Firm*—Capital Patent & Trademark Law Firm, PLLC

(57) ABSTRACT

A network node is described herein which ensures that whenever an ingress station (e.g., PC) communicates a special MAC DA packet then that packet's copies are forwarded (via a high availability VLAN) to its port(s) that are associated with remote network node(s) and/or egress server(s) (e.g., firewall(s)) and not forwarded to its port(s) that are associated with data storage server(s) or ingress station(s) (e.g., PCs). The network node also ensures that whenever an ingress station (e.g., PC) communicates a normal MAC DA packet then that packet's copies are forwarded to all of its port(s) that are associated with ingress station(s), remote network node(s), egress server(s) and/or data storage server(s) so that these stations/servers can maintain their connectivity via a default VLAN.

20 Claims, 5 Drawing Sheets

US 7,673,068 B2

METHOD AND SYSTEM FOR IMPLEMENTING A HIGH AVAILABILITY VLAN

CLAIMING BENEFIT OF PROVISIONAL APPLICATION

This application claims the benefit of U.S. Provisional Application Ser. No. 60/672,308 filed on Apr. 18, 2005, the contents of which are incorporated by reference herein.

BACKGROUND OF THE INVENTION

1. Field of the Invention

The present invention relates in general to a bridged network and, in particular, to a network node (bridge) and method that can re-map a default VLAN to a high availability VLAN when a special MAC DA packet is received.

2. Description of Related Art

The following abbreviations are herewith defined, at least some of which are referred to in the ensuing description of the prior art and the preferred embodiment of the present invention.

| CAM | Content Addressable Memory |
| --- | --- |
| DA | Destination Address |
| MAC | Message Authentication Code |
| PC | Personal Computer |
| VLAN | Virtual Local Area Network |
| VLAN_ID | VLAN Identifier |

Referring to FIG. 1A (PRIOR ART), there is shown an exemplary bridged network 100 which has two network nodes 102 and 104 that enable communications between multiple stations/servers 106a, 106b . . . 106e. In this bridged network 100, assume that ingress station 106a, egress server 106b, egress server 106c, ingress station 106d and data storage server 106e are all members of the same VLAN. As such, these stations/servers 106a, 106b . . . 106e are able to communicate with one another because they belong to the same bridging domain. A discussion about how these stations/servers 106a, 106b . . . 106e are able to communicate with one another is provided next.

In this example, assume the ingress station 106a (e.g., PC 106a) sends a packet 108 which is received at a port 110a within network node 102. Then, a CAM/processor 112 within the network node 102 performs a VLAN classification and determines that port 110a (associated with ingress station 106a), port 110b (associated with egress station 106b) and interswitch port 110f (indirectly associated with egress server 106c, ingress station 106d and data storage server 106e) are members of the same VLAN. In particular, the CAM/processor 112 performs a table look-up using a MAC DA within packet 108 and determines that ports 110a, 110b and 110f are members of the same VLAN. The network node 102 then forwards (or floods) copies of packet 108 to ports 110b and 110f. In this way, the egress server 106b (e.g., firewall 106b) receives a copy of packet 108. And, the network node 104 which is connected to interswitch port 110f receives a copy of packet 108.

The network node 104 also has a CAM/processor 114 which upon receiving packet 108 performs a VLAN classification and in this example it determines that interswitch port 110f and ports 110c, 110d and 110e (associated with egress server 106c, ingress station 106d and data storage server 106e) are members of the same VLAN. In particular, the CAM/processor 114 performs a table look-up using the MAC DA within packet 108 and determines that ports 110c, 110d, 110e and 110f are members of the same VLAN. The network node 104 then forwards (or floods) copies of packet 108 to ports 110c, 110d and 110e. In this way, the egress server 106c (e.g., firewall 106c) which is connected to port 110c receives a copy of packet 108. The ingress station 106d (e.g., PC 106d) which is connected to port 110d receives a copy of packet 108. And, the data storage server 106e which is connected to port 110e receives a copy of packet 108.

However, in some applications, the egress servers 106b and 106c are the only devices that need to obtain a copy of packet 108 if it contained a special MAC DA (as opposed to a normal MAC DA) and if it originated from one of the ingress stations 106a and 106d (e.g., PCs 106a and 106d). For instance, the egress servers 106b and 106c (e.g., firewalls 106b and 106c) may need a copy of this special MAC DA packet 108 so they can perform a routing update. As can be appreciated, it is not very efficient if a special MAC DA packet 108 originating from an ingress station 106a is forwarded to the ingress station 106d and the data storage server 106e. Because, the ingress station 106d and the data storage server 106e do not need a copy of the special MAC DA packet 108. One possible solution to this problem is described below with respect to FIG. 1B (PRIOR ART).

Referring to FIG. 1B (PRIOR ART), there is shown the exemplary bridged network 100 in which the ingress stations 106a and 106d and egress servers 106b and 106c have been made members of a special VLAN in an attempt to address the aforementioned problem. In this scheme, when ingress station 106a (for example) sends a packet 108 (containing a normal/special MAC DA), then the ingress station 106d and egress servers 106b and 106c each receive a copy of the packet 108 (shown in FIG. 1B). Likewise, when ingress station 106d sends a packet 108 (containing a normal/special MAC DA), then the ingress station 106a and egress servers 106b and 106c each receive a copy of packet 108 (not shown in FIG. 1B). This approach has several problems. First, putting the ingress stations 106a and 106d and egress servers 106b and 106c within the special VLAN removes them from the VLAN which included all of the stations/servers 106a, 106d . . . 106e (see FIG. 1A). This is a problem because it is desirable to maintain the connectivity between all of these stations/servers 106a, 106b . . . 106e. Second, if the network nodes 102 and 104 flood copies of the packet 108 within this special VLAN then a copy of the packet 108 will be sent to one ingress station 106a or 106d which is not desirable since only the egress servers 106b and 106c need a copy of this packet 108. Accordingly, there has been and is still a need for a solution which can address this particular problem associated with the traditional bridged network. This need and other needs are addressed by the network node and method of the present invention.

BRIEF DESCRIPTION OF THE INVENTION

The present invention includes a network node which ensures that whenever an ingress station (e.g., PC) communicates a special MAC DA packet then that packet's copies are forwarded (via a high availability VLAN) to its port(s) that are associated with remote network node(s) and/or egress server(s)(e.g., firewall(s)) and not forwarded to its port(s) that are associated with data storage server(s) or ingress station(s) (e.g., PCs). The network node also ensures that whenever an ingress station (e.g., PC) communicates a normal MAC DA packet then that packet's copies are forwarded to all of its port(s) that are associated with ingress station(s), remote network node(s), egress server(s) and/or data storage server(s) so that these stations/servers can maintain their connectivity via a default VLAN.

In one embodiment, the network node can accomplish this by having a CAM/processor that implements a method which includes the following steps: (a) analyze a received packet; (b) classify the port which received the packet as being a member of a default VLAN; and (c) re-analyze the received packet and perform one of the following actions: (i) flood copies of the packet to a first set of pre-selected port(s) which includes ingress port(s), egress port(s), data storage server port(s) and/or interswitch port(s) that are members of the default VLAN if the received packet contains a normal MAC DA; or (ii) re-map a VLAN_ID associated with the default VLAN to another VLAN_ID which is associated with a high availability VLAN and then flood copies of the packet to a second set of selected port(s) which includes egress port(s) and/or interswitch port(s) that are members of the high availability VLAN if the received packet contains a special MAC DA.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1A:
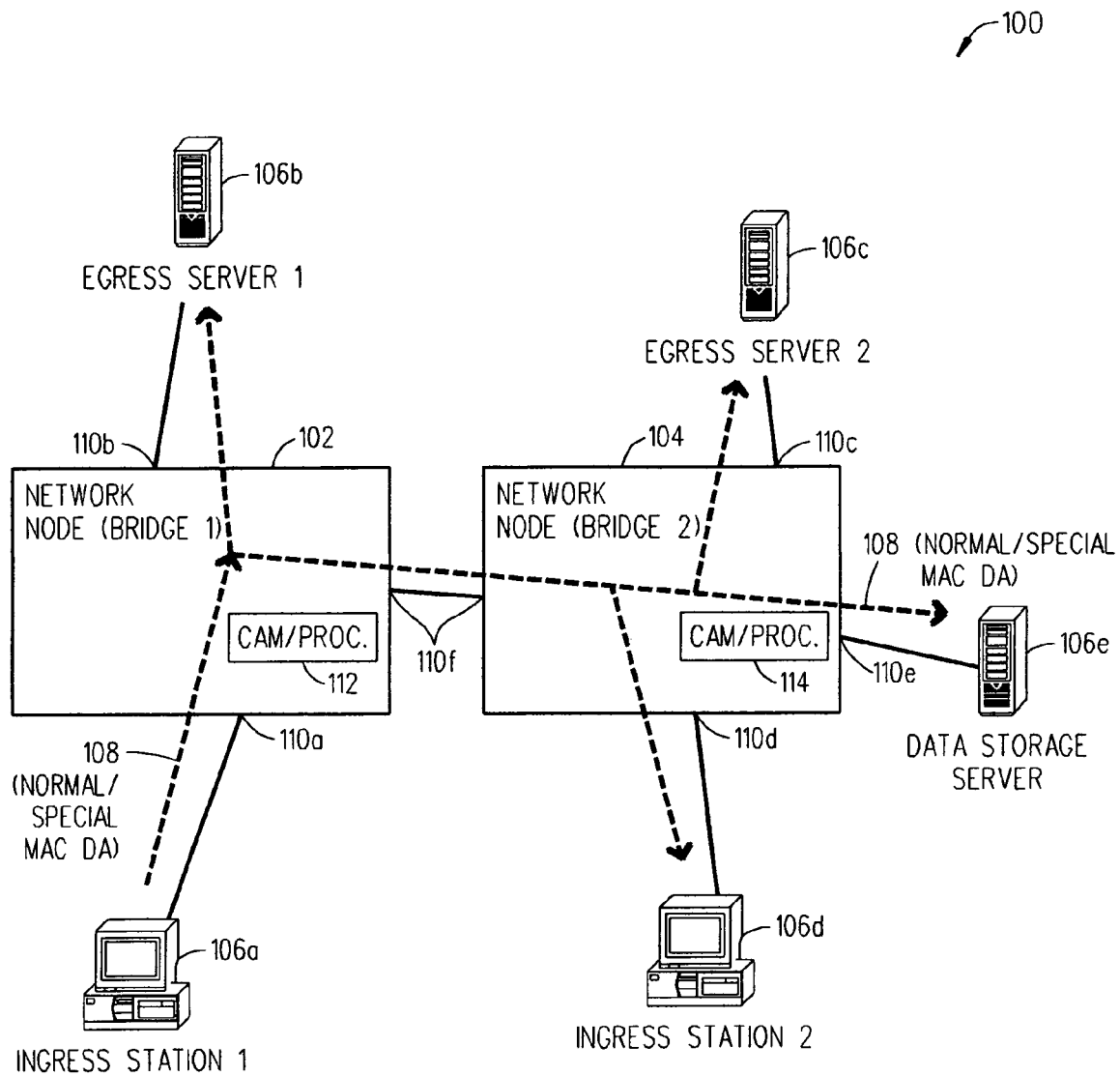
FIG. 1A-1B (PRIOR ART) are two block diagrams which illustrate the basic components of a traditional exemplary bridged network.
Figure 1B:
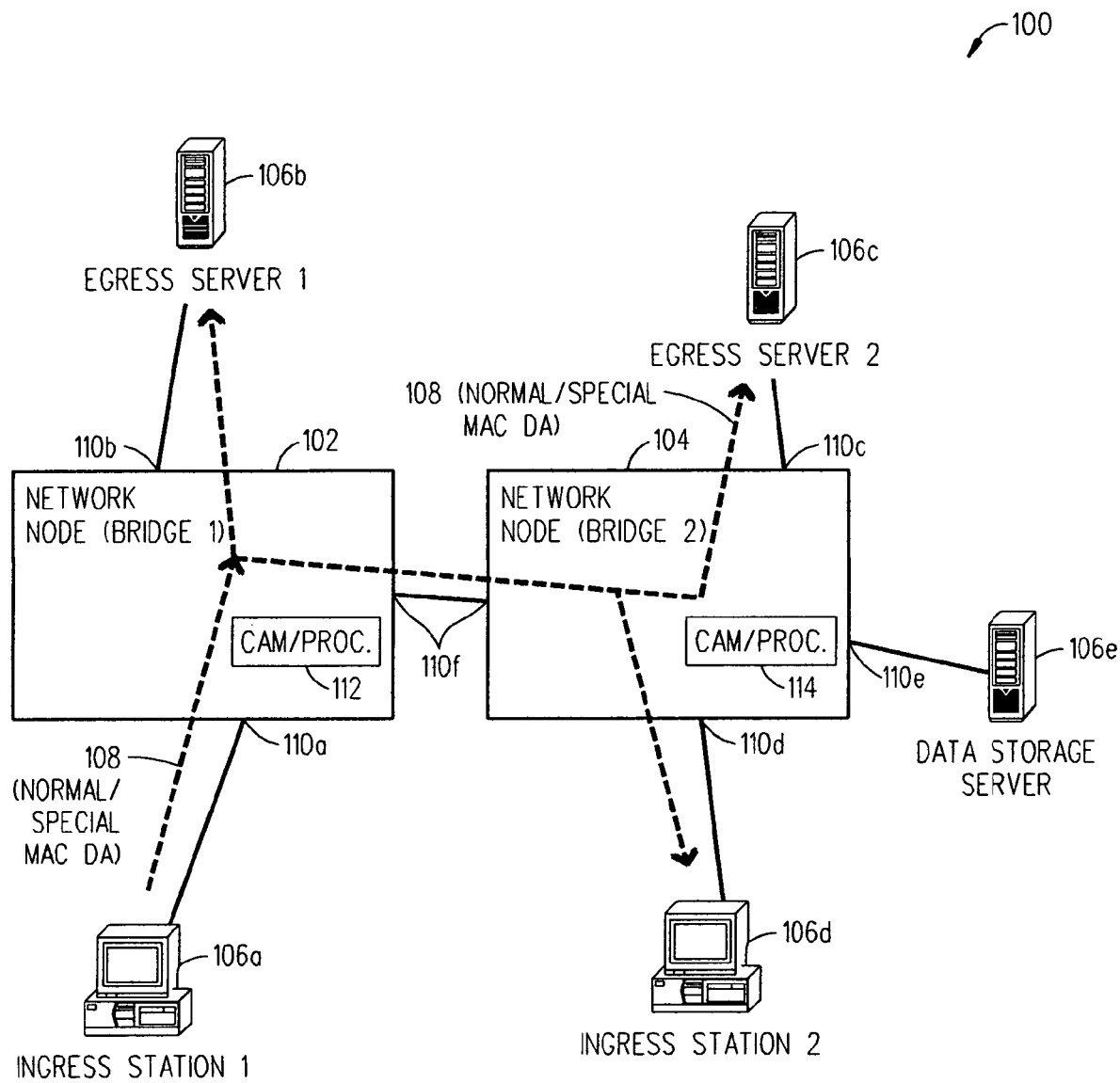
Figure 2A:
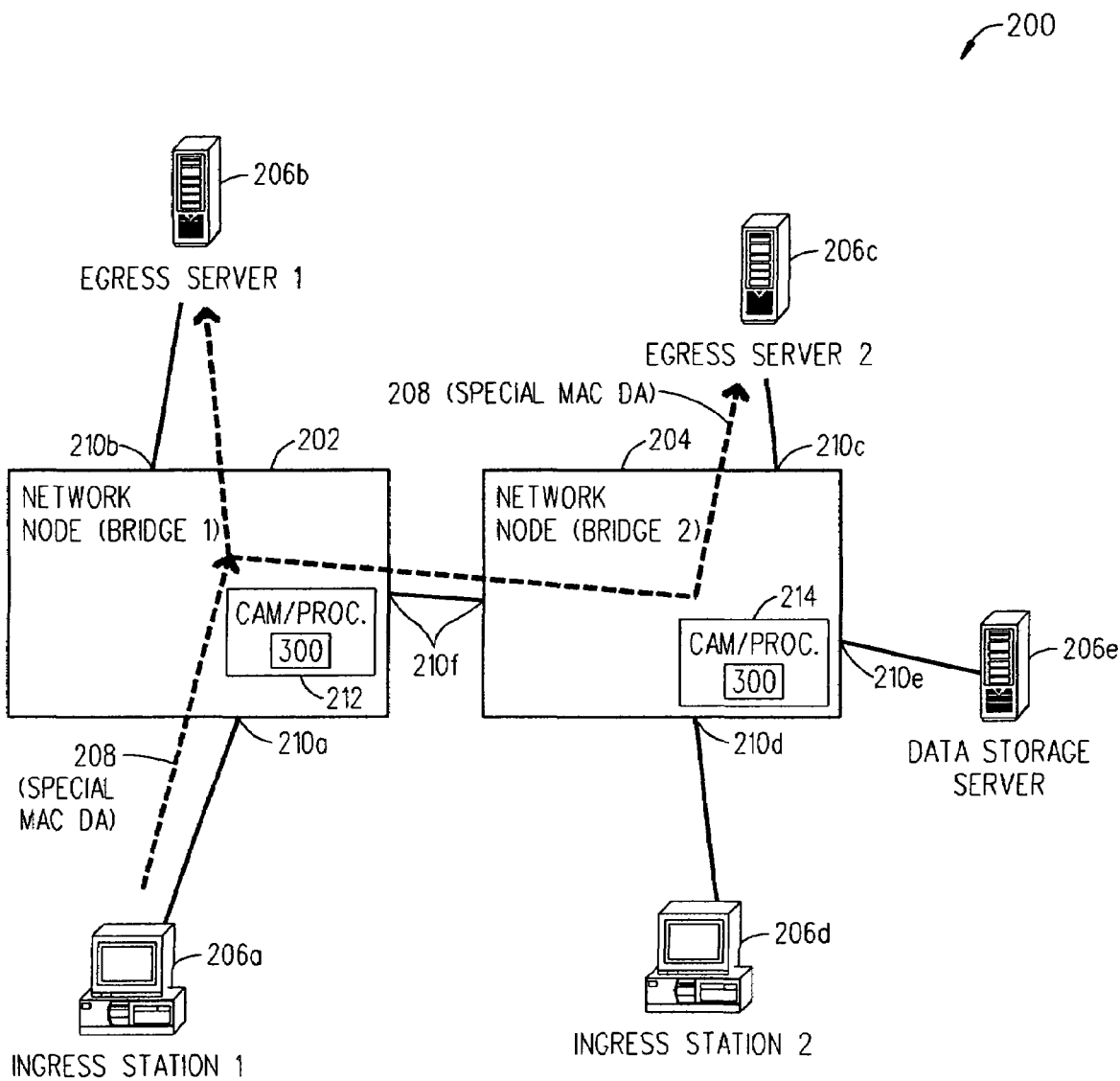
FIGS. 2A-2B are two block diagrams which illustrate the basic components of an exemplary bridged network in accordance with the present invention.
Figure 2B:
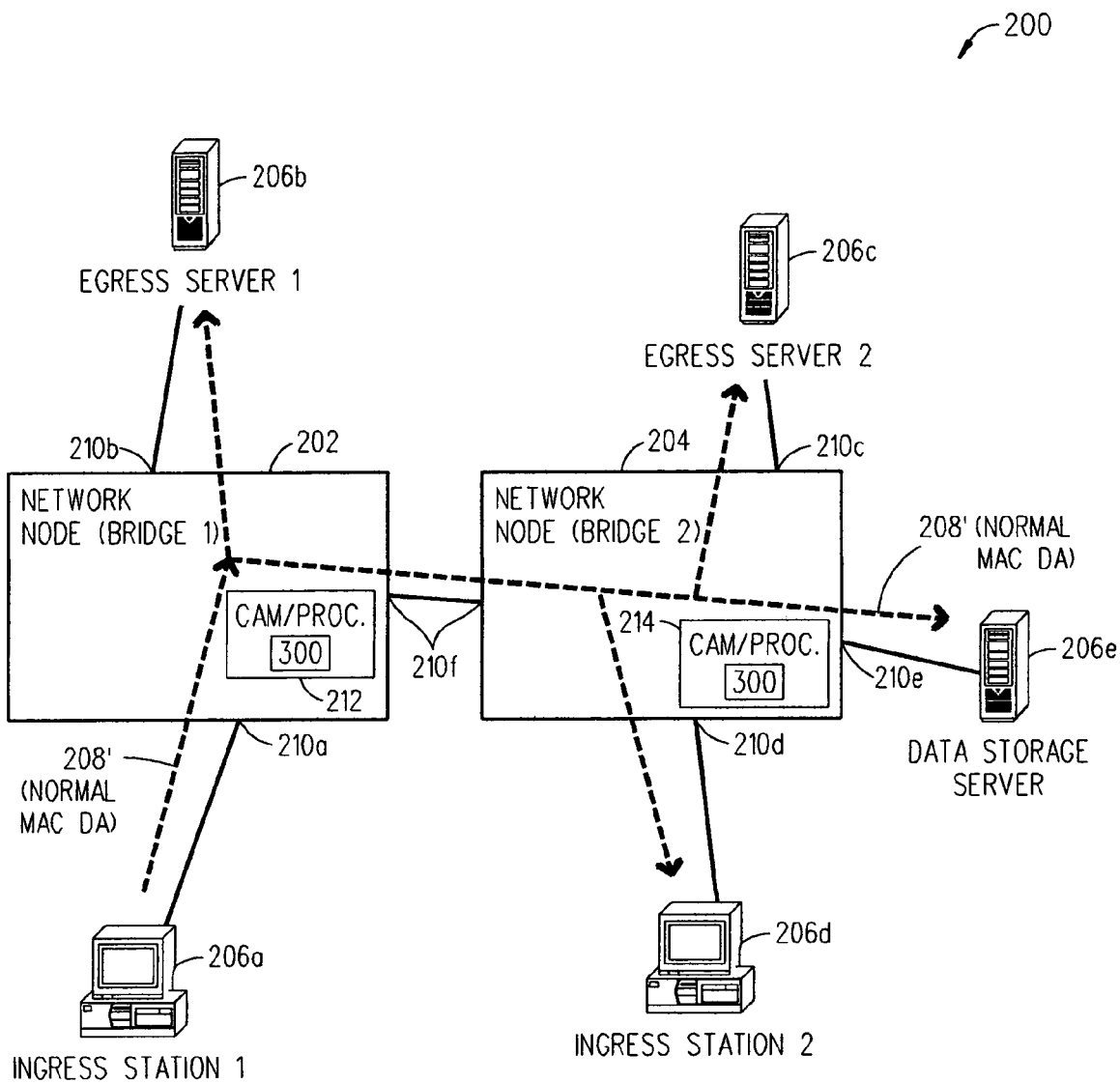

Referring to FIGS. 2A-2B, there is an exemplary bridged network 200 shown which has two network nodes 202 and 204, two ingress stations 206a and 206d (e.g., PCs 206a and 206b), two egress servers 206b and 206c (e.g., firewalls 206b and 206c) and a data storage server 206e. As described below, the present invention ensures that whenever one of these ingress stations 206a or 206d initiates a packet 208 which has a special MAC DA then a copy of that packet 208 is forwarded only to the egress servers 206b and 206c and not to the data storage server 206e the other ingress station 206a or 206d (see FIG. 2A). And, the present invention ensures that all of these stations/servers 206a, 206b . . . 206e will still maintain their connectivity via a default VLAN (see FIG. 2B). This is possible because the network nodes 202 and 204 and in particular the CAMs/processors 212 and 214 implement a new rule that is described in detail below with respect to the exemplary bridged network 200.

Referring now to FIG. 2A, assume that ingress station 206a sends a packet 208 (containing a special MAC DA) which is received at port 210a within the network node 202. Then, the CAM/processor 212 performs a VLAN classification and determines that port 210a (associated with ingress station 206a), port 210b (associated with egress server 206b) and interswitch port 210f (indirectly associated with egress server 206c, ingress station 206d and data storage server 206e) are members of the same default VLAN. In particular, the CAM/processor 212 performs a table look-up using a MAC DA within packet 208 and determines that ports 210a, 210b and 210f are members of the same default VLAN. At this point, the CAM/processor 212 implements the new rule that checks if the MAC DA in packet 208 is a special MAC DA and if the VLAN_ID is the default VLAN. In this case, both of these conditions are true, so the CAM/processor 212 re-maps the VLAN_ID from the default VLAN to another VLAN_ID associated with the high availability VLAN (which includes only the egress port 210b and the interswitch port 210f). The CAM/processor 212 then puts the packet 208 in a flood queue which causes copies of the packet 208 to be forwarded/flooded to port 210b and interswitch port 210f. As a result, the egress server 206b (e.g., firewall 206b) receives a copy of packet 208. And, the network node 204 which is connected to interswitch port 210f receives a copy of packet 208.

Upon receiving the packet 208 at the interswitch port 210f, the network node 204 and in particular the CAM/processor 214 performs a VLAN classification and determines that port 210c (associated with egress server 206c), port 210d (associated with ingress station 206d), and port 210e (associated with data storage server 206e) are members of the same default VLAN. In particular, the CAM/processor 214 performs a table look-up using the MAC DA within packet 208 and determines that ports 210c, 210d and 210f are members of the same default VLAN. At this point, the CAM/processor 214 implements the new rule that checks if the MAC DA in packet 208 is a special MAC DA and if the VLAN_ID is the default VLAN. In this case, both of these conditions are true, so the CAM/processor 214 re-maps the VLAN_ID from the default VLAN to another VLAN_ID associated with the high availability VLAN (which includes only egress port 210c). The CAM/processor 214 then puts the packet 208 in a flood queue which causes a copy of the packet 208 to be forwarded/flooded to port 210c. As a result, the egress server 206c (e.g., firewall 206c) receives a copy of packet 208. The ingress station 206d and the data storage server 206e do not receive a copy of packet 108. Alternatively, it should be appreciated that if a packet 208 (which contained a special MAC DA) originated from ingress station 206d, then that packet's copies would be forwarded to egress servers 206b and 206c. This packet's copies would not reach the data storage server 206e or the ingress station 206a.

Referring now to FIG. 2B, assume the ingress station 206a had sent a packet 208' which contained a normal MAC DA instead of the special MAC DA towards the network node 202. Then, the CAM/processor 212 would have performed a VLAN classification and determined that port 210b (associated with egress server 206b) and interswitch port 210f (indirectly associated with egress server 206c, ingress station 206d and data storage server 206e) are members of the same default VLAN. However, when the CAM/processor 212 implemented the new rule that checks if the MAC DA in packet 208 is a special MAC DA and if the VLAN_ID is the default VLAN, then it would have determined that both of these conditions were not satisfied. Thus, the CAM/processor 212 would have placed the packet 208' in the flood queue which would have caused copies of the packet 208' to be forwarded/flooded to egress port 210b and interswitch port 210f. As a result, the ingress station 206b which is connected to port 210b would have received a copy of packet 208'. And, the network node 204 which is connected to the interswitch port 210f would have received a copy of packet 208'.

Upon receiving the packet 208' at the interswitch port 210f, the network node 204 and in particular the CAM/processor 214 would have performed a VLAN classification and determined that port 210c (associated with egress server 206c), port 210d (associated with ingress station 206d), and port 210e (associated with data storage server 206e) are members of the same default VLAN.

In particular, the CAM/processor 214 would have performed a table look-up using the MAC DA within packet 208' and determined that ports 210c, 210d and 210f are members of the same default VLAN. However, when the CAM/processor 214 implemented the new rule that checks if the MAC DA in packet 208' is a special MAC DA and if the VLAN_ID is the default VLAN, then it would have determined that both of these conditions were not satisfied. Thus, the CAM/processor 214 would have placed the packet 208' in the flood queue which would have caused copies of the packet 208' to be forwarded/flooded to ports 210c, 210d and 210e. As a result, the egress server 206c which is connected to port 210c would have received a copy of packet 208'. The ingress station 206d which is connected to port 210d would have received a copy of packet 208'. And, the data storage server 206e which is connected to the port 210e would have received a copy of packet 208'. As can be seen, the stations/servers 206a, 206b . . . 206e are still able to communicate with each other via the default VLAN and this functionality is not affected by this special rule. A general description about how the network nodes 202 and 204 can implement this new rule to determine whether to distribute packets within either the default VLAN or the high availability VLAN is provided next with respect to FIG. 3.

Figure 3:
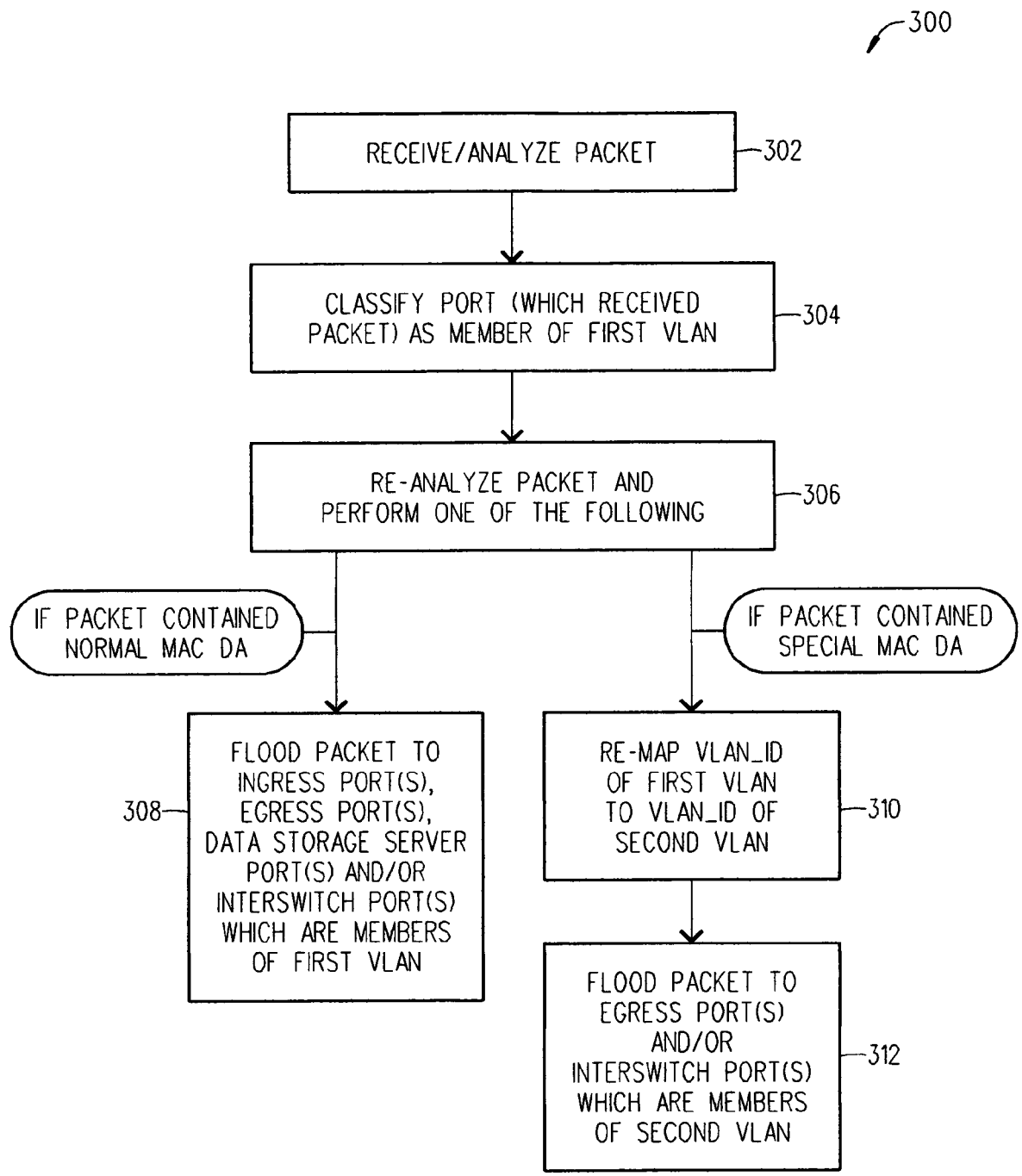
FIG. 3 is a flowchart which illustrates the basic steps of a method in accordance with the present invention.

Referring to FIG. 3, there is a flowchart which illustrates the basic steps of a method 300 which is implemented by a network node (e.g., network nodes 202 and 204) in accordance with the present invention. Beginning at step 302, the network node receives and analyzes a packet that originated from an ingress station. At step 304, the network node performs a VLAN classification and classifies the port (associated with the ingress station) which received the packet as being a member of a first VLAN (default VLAN). At step 306, the network node re-analyzes the received packet and performs one of the following actions: (i) floods copies of the received packet to a first set of pre-selected port(s) which includes ingress port(s), egress port(s), data storage server port(s) and/or interswitch port(s) 210f that are members of the first VLAN (default VLAN) if the received packet contains a normal MAC DA (see step 308 and FIG. 2B); or (ii) re-maps a VLAN_ID of the default VLAN to another VLAN_ID which is associated with a second VLAN (high availability VLAN) (see step 310) and then floods copies of the received packet to a second set of pre-selected port(s) which includes only egress port(s) and/or interswitch port(s) 210f that are members of the second VLAN (high availability VLAN) if the received packet contains a special MAC DA (see step 312 and FIG. 2A). Each network node located within a bridged network should implement method 300.

Following are some additional features and advantages of the present invention:

A configuration management module (not shown) is used to program the CAMS/processors 212 and 214 so they can
identify which ingress port(s), egress port(s), data storage server(s) and/or interswitch port(s) are members of the default VLAN and members of the high availability VLAN.

The bridged network 200 of FIGS. 2A and 2B has an exemplary configuration which is used to help describe the present invention. It should be appreciated that the present invention can be implemented within any type/configuration of a bridged network.

It should be appreciated that there is nothing specific about the special MAC DA or the normal MAC DA. The special MAC DAs are identified by a configuration manager (associated with the processor) and from that point onwards they are treated as special MAC DAs.

The packets that contain a normal MAC DA can for example include a Spanning Tree Protocol (STP) packet or an email packet.

The description herein about the stations/servers 206a, 206b . . . 206e and the network nodes 202 and 204 omitted details which are well known to those skilled in the art. This was done because those details are not necessary to understand the present invention.

Although one embodiment of the present invention has been illustrated in the accompanying Drawings and described in the foregoing Detailed Description, it should be understood that the invention is not limited to the embodiment disclosed, but is capable of numerous rearrangements, modifications and substitutions without departing from the spirit of the invention as set forth and defined by the following claims.

What is claimed is:

1. A network node, comprising:
a plurality of ports;
a processor; and
a content addressable memory (CAM), wherein said processor and said CAM enable the following actions:
analyze a packet received at one of the ports;
classify the port which received the packet as being a member of a first virtual local area network (VLAN);
re-analyze the packet;
flood copies of the packet to a first set of pre-selected port(s) which are members of the first VLAN when the re-analysis determines that the packet contains a normal message authentication code (MAC) destination address; and
re-map a first VLAN_ID associated with the first VLAN to be a second VLAN_ID associated with a second VLAN and then flood copies of the packet to a second set of pre-selected port(s) which are members of the second VLAN when the re-analysis determines that the packet contains a special MAC destination address.

2. The network node of claim 1, wherein said packet originated from an ingress station.

3. The network node of claim 1, wherein said first set of pre-selected port(s) are connected to:
at least one ingress station;
at least one egress server;
at least one data storage server; and/or
at least one additional network node.

4. The network node of claim 3, wherein said ingress station includes a personal computer and said egress server includes a firewall.

5. The network node of claim 1, wherein said second set of pre-selected port(s) are connected to:
at least one egress server; and/or
at least one additional network node.

6. The network node of claim 5, wherein said egress server includes a firewall.

7. The network node of claim 1, wherein said normal MAC destination address indicates said packet is a Spanning Tree Protocol packet or an email packet.

8. The network node of claim 1, wherein said special MAC destination address indicates said packet is a routing update packet.

9. The network node of claim 1, further comprising a configuration management module which is used to program the CAM to know which port(s) are members of the first VLAN and the second VLAN.

10. A method for implementing a high availability virtual local area network (VLAN), said method comprising the steps of:
   receiving a packet;
   analyzing the packet and classifying a port associated with the received packet as being a member of a first VLAN;
   re-analyzing the packet;
   flooding copies of the packet to a first set of pre-selected port(s) which are members of the first VLAN when the re-analysis determines that the packet contains a normal message authentication code (MAC) destination address; and
   re-mapping a first VLAN ID associated with the first VLAN to be a second VLAN_ID associated with a second VLAN and then flooding copies of the packet to a second set of pre- selected port(s) which are members of the second VLAN when the re-analysis determines that the packet contains a special MAC destination address.

11. The method of claim 10, wherein said packet originated from an ingress station.

12. The method of claim 10, wherein said first set of pre-selected port(s) are connected to:
   at least one ingress station;
   at least one egress server;
   at least one data storage server; and/or
   at least one network node.

13. The method of claim 12, wherein said ingress station includes a personal computer and said egress server includes a firewall.

14. The method of claim 10, wherein said second set of pre-selected port(s) are connected to:
   at least one egress server; and/or
   at least one network node.

15. The method of claim 14, wherein said egress server includes a firewall.

16. The method of claim 10, wherein said normal MAC destination address indicates said packet is a Spanning Tree Protocol packet or an email packet.

17. The method of claim 10, wherein said special MAC destination address indicates said packet is a routing update packet.

18. A bridged network, comprising:
   a first network node including a first content addressable memory (CAM), a first processor and a first plurality of ports; and
   a second network node including a second CAM, a second processor and a second plurality of ports, wherein said first network node is connected to said second network node via an interswitch port, and wherein said first CAM/said first processor and said second CAM/said second processor each perform the following actions:
   analyze a packet received at one of their ports;
   classify the port which received the packet as being a member of a first virtual local area network (VLAN);
   re-analyze the packet;
   flood copies of the packet to a first set of pre-selected port(s) which are members of the first VLAN when the re-analysis determines that the packet contains a normal message authentication code (MAC) destination address; and
   re-map a first VLAN_ID associated with the first VLAN to be a second VLAN_ID associated with a second VLAN and then flood copies of the packet to a second set of pre-selected port(s) which are members of the second VLAN when the re-analysis determines that the packet contains a special MAC destination address.

19. The bridged network of claim 18, wherein said first set of pre-selected port(s) include:
   at least one ingress port;
   at least one egress port;
   at least one data storage server port; and/or
   said interswitch port.

20. The bridged network of claim 18, wherein said second set of pre-selected port(s) include:
   at least one egress server; and/or
   said interswitch port.

* * * * *